US007237116B1

(12) United States Patent
Dwork et al.

(10) Patent No.: US 7,237,116 B1
(45) Date of Patent: Jun. 26, 2007

(54) DIGITAL SIGNATURE SYSTEM AND METHOD BASED ON HARD LATTICE PROBLEM

(75) Inventors: Cynthia Dwork, San Francisco, CA (US); Shanmugasundaram Ravikumar, San Jose, CA (US); Amit Sahai, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/487,502

(22) Filed: Jan. 19, 2000

(51) Int. Cl.
*H04L 9/00* (2006.01)
(52) U.S. Cl. .......................................... 713/180; 380/28
(58) Field of Classification Search .................. 380/28, 380/30; 713/176, 180
See application file for complete search history.

(56) References Cited

U.S. PATENT DOCUMENTS

| | | | | |
|---|---|---|---|---|
| 5,231,668 A | 7/1993 | Kravitz | ........................ | 380/28 |
| 5,375,170 A | 12/1994 | Shamir | ........................ | 380/30 |
| 5,483,598 A | 1/1996 | Kaufman et al. | ............. | 380/43 |
| 5,604,805 A | 2/1997 | Brands | ........................ | 380/30 |
| 5,708,714 A | 1/1998 | Lopez et al. | .................. | 380/25 |
| 5,737,425 A | 4/1998 | Ajtai | ........................... | 380/30 |
| 5,832,089 A | 11/1998 | Kravitz | ........................ | 380/24 |

OTHER PUBLICATIONS

Miklos Ajtai and Cnthia Dwork, A Public-Key Cryptosystem with Worst-Case/Average-Case Equivalence Electronic Colloquium on Computer Complexity, Nov. 8, 1996.*

Whitfield Diffie and Martin Hellman, New Directions in Cryptography, IEEE 1976.*

Eric W. Weisstein, CRC Concise Encyclopedia of Mathematics.*

Diffie and Hellman, New Direction in Cryptography, IEEE Trans. on Info. Theory, vol. IT-22, Nov. 1976. pp. 644-654.*

Rivest, Shamir and Adleman, A Method for Obtaining Digital Signatures and Public-key Cryptosystem, Communications ACM, vol. 21, Feb. 1978, pp. 120-126.*

Randal K. Nichols, ICSA Guide to Cryptography McGraw-Hill1999.*

Goldreich, Public-Key Cryptosystems from Lattice Reduction Problems, Nov. 12, 1996, MIT laboratory for Computer Science, pp. 0-29.*

* cited by examiner

*Primary Examiner*—Kim Vu
*Assistant Examiner*—Paula Klimach
(74) *Attorney, Agent, or Firm*—John L. Rogitz

(57) ABSTRACT

A sender computer maps a randomized concatenation of a message μ to a point "x" in space using a function that renders it infeasible that a second message can be mapped nearby the message μ. The function can be a collision intractable or non-collision intractable function that maps the message to a point "x" on a widely-spaced grid, or the function can map the message to a point "x" of an auxiliary lattice. In either case, the sender computer, using a short basis (essentially, the private key) of a key lattice $\mathcal{L}$ finds a lattice point "y" that is nearby the message point "x", and then at least the points "x", "y", and message are sent to a receiver computer. To verity the signature, the receiver computer simply verifies that "y" is part of the lattice using a long basis (essentially, the public key), and that the distance between "x" and "y" is less than a predetermined distance, without being able or having to know how the lattice point "y" was obtained by the sender computer.

27 Claims, 1 Drawing Sheet

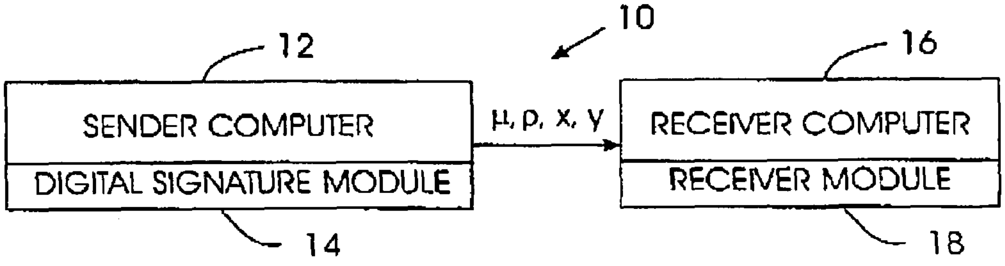
*FIG. 1 - SYSTEM*
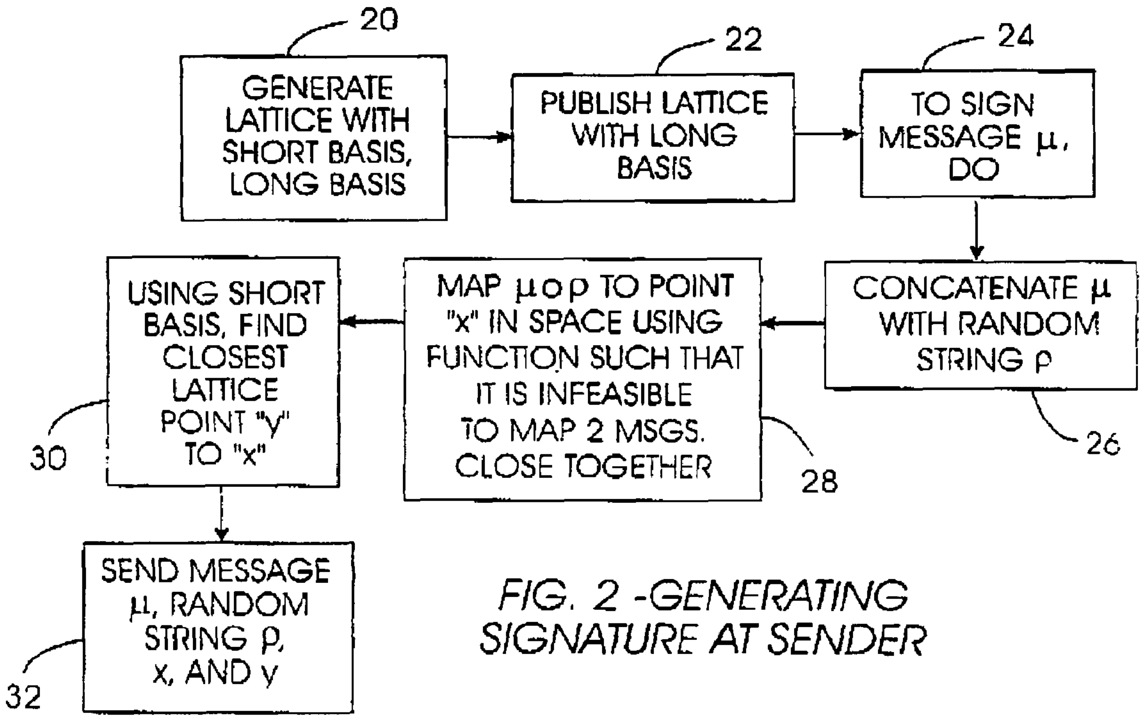
*FIG. 2 -GENERATING SIGNATURE AT SENDER*
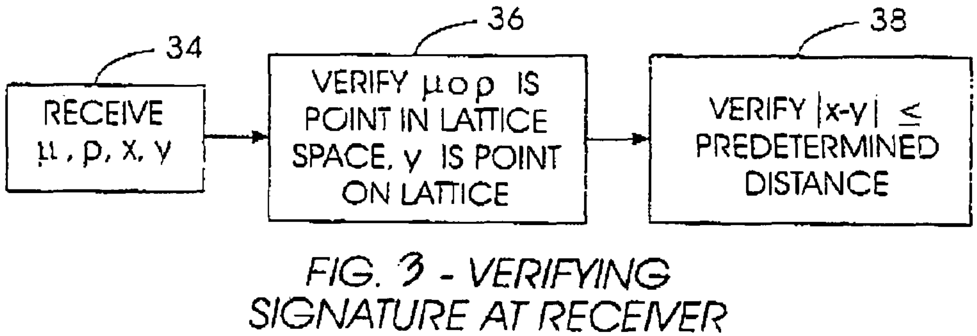
*FIG. 3 - VERIFYING SIGNATURE AT RECEIVER*

DIGITAL SIGNATURE SYSTEM AND METHOD BASED ON HARD LATTICE PROBLEM

BACKGROUND OF THE INVENTION

1. Field of the Invention

The present invention relates generally to systems and methods for producing digital signatures based on the hardness of solving a worst-case lattice problem 2. Description of the Related Art Digital signatures are used for many applications, including verifying the identity of the sender of a message. Most digital signature schemes rely on the difficulty of factoring a large number obtained as a product of two large prime numbers, or on computing discrete logarithms.

Goldreich et al. proposed using lattice reduction problems as a basis for producing digital signatures in *Advances in Cryptography—CRYPTO, Springer LNCS,* 1294:112-131 (1997). A lattice is a collection of points in n-dimensional space which satisfy certain properties, including (1) zero is in the set; (2) if a, b are in the set, then a+b, a−b are also in the set; (3) the lattice is generated by at least one finite basis, i.e., there exists a finite set (called a "basis") such that every point in the lattice is expressible as an integer linear combination of the elements in the basis. The "length" of a basis is the length of the longest vector in the basis. It happens that a lattice typically can be defined using one of many bases, with the shortest basis being hard to find when the number "n" of dimensions becomes large.

Accordingly, the present invention recognizes that in a lattice-based digital signature scheme, an n-dimensional lattice can be generated that has a hard-to-find short basis, which is used as a sender's private key to sign a message by mapping the message to a point in the n-dimensional space. A recipient of the message can access a public key—the lattice with a relatively long basis—to verify the sender's identity by verifying the location of the message in the n-dimensional space. Unfortunately, the scheme disclosed by Goldreich et al., as admitted by Goldreich et al., might result in mapping two messages close together in the n-dimensional space, which would defeat the scheme as to those two messages because both messages would have the same digital signature.

In the present assignee's U.S. Pat. No. 5,737,425 to Ajtai, incorporated herein by reference, an interactive message authentication system is disclosed which uses lattices. Although directed primarily to message authentication, the '425 patent discloses a method for deriving a lattice with a short basis. As recognized by the present invention, however, a digital signature system, unlike a message authentication system, must provide irrefutability of a signature, such that a recipient of a message can show a message to a third party to prove the identity of the signer of the message, a feature not generally required in message authentication systems. The requirement of irrefutability is particularly important in e-commerce applications. Moreover, the invention disclosed in Ajtai is interactive, which in the context of digital signatures could render it susceptible to so-called "intruder in the middle" attacks. With the above recognitions in mind, the present invention has provided the inventive solutions disclosed below.

SUMMARY OF THE INVENTION

A computer-implemented method is disclosed for digitally signing data. The method includes generating a lattice $\mathcal{L}$ having at least one short basis establishing a private key and at least one long basis establishing a public key. Further, the method includes mapping at least the message μ or a concatenation thereof to a message point "x" in n-dimensional space using a function "f". The function "f" is selected such that the possibility of mapping two messages close together in the space is infeasible. Using the short basis, a lattice point "y" of the lattice $\mathcal{L}$ is found that is close to the message point "x".

In a preferred embodiment, at least the message point "x" and the lattice point "y" are returned as a digital signature. If desired, the function "f" can be randomized by concatenating the message μ with a random number ρ. Both the message μ and random number ρ are binary strings.

In one embodiment, the function "f" maps the message μ to a point on a grid. In this embodiment, the function "f" can be collision intractable, the collision intractability of which is derived from the hardness of lattice problems. In another embodiment, the function "f" is collision intractable. In still another embodiment, the function "f" maps at least the message to a point on an auxiliary lattice.

The present method can also include verifying a digital signature at a receiver computer at least in part by determining whether a difference between the lattice point "y" and the message point "x" is no more than a predetermined distance. The predetermined distance can be related to the number of dimensions in the lattice $\mathcal{L}$.

In another aspect, a computer program storage device includes a program of instructions for generating a digital signature for a message. The program of instructions in turn includes computer readable code means for mapping a message μ or a concatenation with a random string ρ to a message point "x" in n-dimensional space, with the message point "x" being a point of a grid or a point of an auxiliary lattice. Also, computer readable code means find a point "y" of a key lattice $\mathcal{L}$ that is nearby the message point "x", and computer readable code means establish a digital signature, based at least on the points "x" and "y".

In still another aspect, a computer system for generating a digital signature of a message μ includes at least one sender computer. The sender computer includes logic for executing method steps that include mapping the message μ to a message point "x" at which it is not feasible to map any other message. Moreover, the logic of the sender computer finds a lattice point "y" that is relatively close to the message point "x", and then the logic transmits at least the message μ and the points "x" and "y". Further, the system includes at least one receiver computer that receives the message μ and points "x" and "y" and that executes logic including determining whether a distance between the points "x" and "y" is related in a predetermined way to a predetermined distance. Based thereon, it is determined whether the message μ has been properly signed.

In yet another aspect, a computer-implemented method for digitally signing data includes generating a lattice $\mathcal{L}$ having at least one short basis and at least one long basis. The method also includes mapping at least the message μ or a concatenation thereof to a message point "x" in n-dimensional space. The message point "x" is an element of a set of spaced-apart points. Using the short basis, a lattice point "y" of the lattice $\mathcal{L}$ is found that is close to the message point "x".

BRIEF DESCRIPTION OF THE DRAWINGS

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present system;

FIG. 2 is a flow chart of the logic used during generation of a lattice-based digital signature; and FIG. 3 is a flow chart of the logic for verifying the digital signature.

DETAILED DESCRIPTION OF THE PREFERRED EMBODIMENTS

Referring initially to FIG. 1, a preferably non-interactive system for generating digital signatures based on lattice problems is shown, generally designated 10. Because the preferred system 10 is non-interactive, it is immune from so-called "intruder in the middle" attacks. In the particular architecture shown, the system 10 includes a sender computer 12 that executes a software-implemented digital signature module 14 in accordance with the logic below to digitally sign messages. As shown in FIG. 1, the sender computer 12 can send a message $\mu$, a message point "x", a lattice point "y", and, if desired, a randomly generated number $\rho$ in accordance with the disclosure below to a receiver computer 16. In turn, the receiver computer 16 executes a receiver module 18 to verify the signature.

It is to be understood that the logic disclosed herein may be executed by a processor as a series of computer-executable instructions. The instructions may be contained on a data storage device with a computer readable medium, such as a computer diskette. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled $C^{++}$ compatible code.

In any case, the flow charts herein illustrate the structure of the modules of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

FIG. 2 shows the logic of the digital signature module 14. The following notation is used for the below discussion. The notation that $x \in_R X$ means that the number "x" is chosen uniformly randomly from the set X. For a binary string x, the symbol $|x|$ denotes its length. For binary strings x, y, the symbol $x \bigcirc y$ denotes their concatenation. All distances and norms are assumed to be Euclidean. For all integers a, b>0, the notation $Z^a_c$ is the set of all a-tuples of integers in the set $\{0, 1, \ldots, c-1\}$. Similarly, $Z^{axb}_c$ is the set of all matrices of "a" rows and "b" columns whose elements are integers in the set $\{0, 1, \ldots, c-1\}$. For a set $b_1, \ldots b_n$ of vectors, $\mathcal{L}$ denotes the lattice of all integer linear combinations of $b_1, \ldots b_n$, with the vectors establishing a "basis" of the lattice $\mathcal{L}$. The length of a basis is the Euclidean norm of the length of the longest vector in the basis. Finally, the symbol [x] denotes the integer portion of a number x.

With the above discussion in mind, commencing at block 20 in FIG. 2, a lattice $\mathcal{L}$ is generated that has a short basis and at least one long basis. The lattice $\mathcal{L}$ preferably is generated using the principles set forth in the present assignee's U.S. Pat. No. 5,737,425 to Ajtai. It is to be understood that the short basis of the lattice $\mathcal{L}$ is generated along with the lattice, but that once the lattice is known, it is a difficult if not impossible problem to reverse engineer the short basis. The long basis of the lattice, accordingly, is published as the public key at block 22 and the short basis is maintained in secrecy as the private key of the present digital signature scheme.

In any case, in the preferred method for generating the lattice $\mathcal{L}$ set forth in the above-referenced patent, a variable "r" is selected that is sufficiently large such that the worst-case problems discussed in Ajtai, "Generating Hard Instances of Lattice Problems", *Proc. 28th ACM Symposium on Theory of Computing,* pages 99-108 (1996) and incorporated herein by reference, are hard. Moreover, variables $c_{L1}$ and $c_{L2}$ are selected such that it is infeasible to find vectors of length $r^3$ in n-dimensional lattices constructed in accordance with the above-referenced patent. Preferably, $c_{L2} \geqq 9$ and $c_{L1} > c_{L2}$.

Letting $n = c_{L1} r(\log r)$, finding vectors of length $r^3$ is infeasible in the n-dimensional lattice $\mathcal{L}$ that is created at block 20, assuming that certain worst-case lattice problems are hard in lattices of dimension n. Further, let $q_L$ be the least odd integer satisfying $q_L \geqq [r^{cL2}]$, let $K = r^3$, and let $M = (nq_L)^{1/2}$. The preferred key lattice $\mathcal{L}$ is a random lattice in $\Gamma(n,M)$ as defined in the above-referenced patent, where an efficient construction of the lattice is also described that has a short basis generated along with it having a length of at most K/3n. In contrast, the public (long) basis preferably is at most of length M.

When the sender computer 12 desires to send a message $\mu$, it enters a DO loop at block 24. Moving to block 26, the logic can, if desired, concatenate the message $\mu$ with a random string $\rho$. Then, proceeding to block 28, the message $\mu$ (or, more preferably, the concatenation $\mu \bigcirc \rho$) is mapped to a message point "x" in n-dimensional space using a function "f" that is chosen such that it is infeasible that two messages would be mapped close to each other in space. "Close" is defined further below in the context of the two grid-based mapping methods and one auxiliary lattice-based mapping method.

More specifically, for the grid-based methods, assume that A is an n-dimensional grid of size "d", where the preferred $d = r^4$. Also, let $\ell = n^3 q_L$, and let the above-mentioned function "f" be established by a mapping hash function H: $\{0,1\}^n \rightarrow \{0,1\}^\ell$. Further assume that the magnitude of the message is one-half n, i.e., that $|\mu| = n/2$. First, $\rho$ is selected from the set $\{0,1\}^{n/2}$, and then the message point "x" is determined as an n-tuple of integers multiplied by "d" as follows: $x = H(\mu \bigcirc \rho)d$. If the message point "x" as computed happens to be a point on the key lattice $\mathcal{L}$, the process above repeats with anew random string $\rho$.

In a first implementation of the grid-based method, the mapping function H is any hash function that satisfies the so-called Magic Hash Function condition that there exists an efficiently and publicly computable function that behaves like a random oracle. Some combination of hash functions such as Message Digest 5 (MD-5), "Sha", and "Snefru" are assumed to approximate the Magic Hash Function. Such a function is not collision-intractable.

In a second implementation of the grid-based method, the mapping function H is a collision-intractable function, preferably a lattice-based hash function, wherein $c_{L1}$ and $c_{L2}$ have the property that it is infeasible to find vectors of length $r^3$ in the lattice described in the above-referenced Ajtai publication. In this implementation, assume that $q_H$ is the least odd integer satisfying $q_H \geqq [r^{cL2+4}]$. The output of the hash function is n-tuples of integers in the set $\{0, 1, \ldots, q_{H-1}\}$. Further assume that $c_{H2}=c_{L2}+4$, and $c_{H1}=c_{L1}$, so that $n=c_{H1} r\log(r)=c_{L1} r\log(r)$.

With the above definitions in mind, in the grid-based collision intractable embodiment, the mapping function $H \in_R Z^{rxn}{}_{qH}$, and a variable m is a vector in $Z^n{}_2$ that is an element of $\{0,1\}^n$. With this notation, $H(m)=Hm \bmod q_H \in Z^r{}_{qH}$, the output of which function is an r-tuple of integers in $Z_{qH}$. This output is interpreted as n integers of equal length, i.e., as a point in $Z^n$. As understood herein, it is computationally infeasible to find vectors of length "n" in the n-dimensional lattice of vectors$=x \in \{0,1\}^n$ such that $Hx=0 \bmod q_H$. In other words, finding vectors of length $r^3>n$ in the lattice of vectors defined by $x \in \{0,1\}^n$ is computationally infeasible. Moreover, it is to be appreciated that the collision intractability of the function "f" as implemented in the last of the above-disclosed grid-based mapping methods, and in the below-disclosed auxiliary lattice mapping method, is derived from the hardness of lattice problems.

As mentioned above, instead of using either of the two grid-based methods set forth above, a mapping using an auxiliary lattice can be undertaken at block 28. In this embodiment, assume that "A" is an n-dimensional auxiliary lattice chosen according to the same distribution as the key lattice $\mathcal{L}$ is chosen. Accordingly, $c_{A1}=c_{L1}$ and $n=c_{A1} r\log(r)$, $q_A=q_H$, and it is easy to find a basis for the auxiliary lattice A of length $M=(nq_A)^{1/2}$. Let P be a public matrix whose columns are the above-disclosed long basis vectors for the auxiliary lattice A.

With the above definitions in mind, the message μ is concatenated, if desired, with the random string ρ as before at block 26, but then at block 28 the message point "x" is determined by multiplying the concatenation by the public matrix P. If the message point x is found to be an element of the key lattice $\mathcal{L}$, another random string ρ is selected and the process repeats.

In any case, it is to be appreciated that in the grid-based or lattice-based mapping schemes disclosed above, the message μ is mapped to a message point "x" that is a point on a grid or a lattice. In other words, in contrast to previous lattice mapping schemes the message point "x" must be an element of a set of points that are spaced apart from each other in n-dimensional space, such that no two points in the set are close together. This makes it infeasible that any two messages will be mapped to locations that are sufficiently close together so as to make a single signature apply to both.

Once the message has been mapped to the message point, the logic moves from block 28 to block 30, wherein a closest point "y" of the key lattice $\mathcal{L}$ to the message point "x" is determined, using the (private) short basis of the key lattice $\mathcal{L}$. Specifically, using the short basis, a point $y \in \mathcal{L}$ is obtained such that $\|x-y\| \leqq nK/(3n)$ (which, it will be recalled, $=r^3/3$) by writing x as a linear (possibly non-integral) combination of vectors in the short basis, each of which has a length of a most K/(3n), and then rounding the coefficients to get $y \in \mathcal{L}$. Then, at block 32, the message μ, random string ρ (if used), message point "x", and closest lattice point "y" are output for transmission of the message with lattice-based digital signature to the receiver computer 16.

FIG. 3 shows that logic by which the receiver module 18 of the receiver computer 16 verifies the signature output at block 32. Commencing at block 34, the message μ, random string ρ (if used), message point "x", and closest lattice point "y" are received. Moving to block 36, it is verified, using the long basis, that the lattice point "y" is indeed a point on the key lattice $\mathcal{L}$. If desired, it can be further verified that $\mu \bigcirc \rho \in Z^n{}_2$. When a grid-based mapping method is employed, it can be further verified that $x=H(\mu \bigcirc \rho)d$, whereas when an auxiliary lattice mapping method is used it can be verified that $x=P(\mu \bigcirc \rho)$.

Moreover, using the long basis the receiver computer 16 moves to block 38 to verify that the message point "x" is indeed close to the lattice point "y". In a particularly preferred embodiment, this is done by verifying that $\|x-y\| \leqq r^3/3$. More generally, at block 38 it is determined whether a difference between the lattice point "y" and the message point "x" is no more than a predetermined distance. If any test fails, it can be determined that the message μ has not been properly signed.

While the particular DIGITAL SIGNATURE SYSTEM AND METHOD BASED ON HARD LATTICE PROBLEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A computer-implemented method for digitally signing data, comprising:

generating a lattice $\mathcal{L}$ having at least one short basis establishing a private key and at least one long basis establishing a public key;

mapping at least the message μ or a concatenation thereof to a message point "x" in n-dimensional space using a function "f" rendering infeasible the possibility of mapping two messages together in the space; and using the short basis, finding a lattice point "y" of the lattice $\mathcal{L}$ that is close to the message point "x" and using at least the message point "x" and lattice point "y", digitally signing an entity, wherein the function "f" maps the message μ to a point on a grid and is collision intractable.

2. The method of claim 1, further comprising randomizing the function "f".

3. The method of claim 2, wherein the function "f" is randomized by concatenating the message μ with a random number ρ.

4. The method of claim 1, wherein the collision intractability of the function "f" is derived from the hardness of lattice problems.

5. The method of claim 1, wherein the function "f" maps at least the message to a point on an auxiliary lattice.

6. The method of claim 1, further comprising verifying a digital signature at least in part by determining whether a difference between the lattice point "y" and the message point "x" is no more than a predetermined distance.

7. The method of claim 6, wherein the predetermined distance is related to the number of dimensions in the lattice $\mathcal{L}$.

8. A computer program storage device including a program of instructions for generating a digital signature for a message, the program of instructions including:

computer readable code means for mapping a message μ or a concatenation thereof to a message point "x" in n-dimensional space, the message point "x" being a point of a grid or a point of an auxiliary lattice;

computer readable code means for finding a point "y" of a key lattice $\mathcal{L}$ that is not the same as the auxiliary lattice; and computer readable code means for establishing a digital signature, based at least on the points "x" and "y".

9. The computer program storage device of claim 8, wherein the means for mapping uses a function "f" rendering infeasible the possibility of mapping two messages close together in the space, and wherein the means for finding includes using a hard to find short basis of the key lattice $\mathcal{L}$.

10. The computer program storage device of claim 9, further comprising means for randomizing the function "f".

11. The computer program storage device of claim 10, wherein the function "f" is randomized by concatenating the message μ with a random number ρ.

12. The computer program storage device of claim 9, wherein the function "f" maps at least the message to a point on an auxiliary lattice.

13. The computer program storage device of claim 8, wherein the function "f" maps the message μ to a point on a grid, and wherein the function "f" is collision intractable, the collision intractability being derived from the hardness of lattice problems.

14. The computer program storage device of claim 8, wherein the function "f" is not collision intractable.

15. A computer system for generating a digital signature of a message μ, comprising:

at least one sender computer including logic for executing method steps including:

mapping the message μ to a message point "x" at which it is not feasible to map any other message;

finding a lattice point "y"; and transmitting at least the message μ and the points "x" and "y";

at least one receiver computer receiving the message μ and points "x" and "y" and including logic for executing method steps including:

determining whether a distance between the points "x" and "y" is related in a predetermined way to a predetermined distance, and based thereon determining whether the message μ has been properly signed.

16. The system of claim 15, wherein the mapping act is undertaken using a function "f" that maps the message point "x" to a point of a grid or of an auxiliary lattice, and further wherein the lattice point "y" is a member of a lattice $\mathcal{L}$, and the finding act is undertaken using a hard-to-find short basis of the lattice $\mathcal{L}$.

17. The system of claim 16, wherein the acts undertaken by the logic of the sender computer further comprise randomizing the function "f" by concatenating the message μ with a random number ρ.

18. The system of claim 16, wherein the function "f" is collision intractable.

19. The system of claim 18, wherein the collision intractability of the function "f" is derived from the hardness of lattice problems.

20. The system of claim 16, wherein the function "f" is not collision intractable.

21. The system of claim 16, wherein the predetermined distance is related to the number "r" of dimensions in the lattice $\mathcal{L}$.

22. A computer-implemented method for digitally signing data, comprising:

generating a lattice $\mathcal{L}$ having at least one short basis and at least one long basis;

mapping at least the message μ or a concatenation thereof to a message point "x" in n-dimensional space, the message point "x" being an element of a set of spaced-apart points not on the lattice; and using the short basis, finding a lattice point "y" of the lattice $\mathcal{L}$; and using at least the message point "x" and lattice point "y", digitally signing an entity, wherein the mapping is undertaken using a function "f" that is not collision intractable.

23. The method of claim 22, further comprising randomizing the function "f" by concatenating the message μ with a random number ρ.

24. The method of claim 22, wherein the function "f" maps the message μ to a point on a grid.

25. The method of claim 22, wherein the function "f" maps at least the message to a point on an auxiliary lattice.

26. The method of claim 22, further comprising verifying a digital signature at least in part by determining whether a difference between the lattice point "y" and the message point "x" is no more than a predetermined distance.

27. The method of claim 26, wherein the predetermined distance is related to the number of dimensions in the lattice $\mathcal{L}$.

* * * * *